United States Patent
Turpin et al.

[15] 3,645,516
[45] Feb. 29, 1972

[54] METHOD OF AND APPARATUS FOR PREHEATING SCRAP METAL

[72] Inventors: Alexander J. Turpin; William T. Yarnell, both of Lebanon, Pa.

[73] Assignee: Buell Engineering Company, Inc., Lebanon, Pa.

[22] Filed: Apr. 20, 1970

[21] Appl. No.: 30,010

[52] U.S. Cl. ................................................263/40, 263/37
[51] Int. Cl. ..........................................................F27b 3/02
[58] Field of Search .......................263/17, 36, 37, 40, 43, 52

[56] References Cited

UNITED STATES PATENTS 3,379,425  4/1968  Dell'Agnese et al. .....................263/17

Primary Examiner—John J. Camby
Attorney—Brumbaugh, Graves, Donohue & Raymond

[57] ABSTRACT

Scrap metal contained in a receptacle is preheated, preparatory to charging it into refining apparatus, by circulating through it hot gases generated by burning a carbonaceous fuel in a combustion chamber remote from the receptacle. The hot gases from the heating chamber are conducted along a confined path into generally the center of the scrap in the receptacle and are withdrawn from the receptacle and returned to the heating chamber, a portion of the exhaust gases being recirculated back to the scrap. Part of the gases in the combustion chamber are vented to a stack to make way for the introduction of the oxygen-containing gas that supports combustion in the combustion chamber. A substantial part of the combustibles in the scrap are vaporized and withdrawn from the scrap and are delivered to and burned in the combustion chamber, thus limiting a significant pollution factor in the operation. The combustion chamber and gas circulating equipment constitutes a unitary furnace structure that may be moved into and out of position in operative relation to the scrap receptacle.

25 Claims, 4 Drawing Figures

Patented Feb. 29, 1972

INVENTORS
ALEXANDER J. TURPIN &
WILLIAM T. YARNELL
BY
Bumbaugh, Graves, Donohue & Raymond
their ATTORNEYS Patented Feb. 29, 1972

INVENTORS
ALEXANDER J. TURPIN &
WILLIAM T. YARNELL

BY their ATTORNEYS

METHOD OF AND APPARATUS FOR PREHEATING SCRAP METAL

BACKGROUND OF THE INVENTION

This invention relates to a method of and an apparatus for preheating scrap metal preparatory to charging it into a refining apparatus, such as an electric furnace.

As is well known to those skilled in the art, a charge of ferrous metal to be refined in a refining apparatus, such as an electric furnace, usually includes a substantial amount of scrap. Although the scrap may be charged directly into the furnace without any special preparation, there are a number of reasons why it is advisable to preheat the scrap before it is introduced into the furnace. For one thing, the cost of bringing the scrap metal up to melting temperature in a refining furnace, and particularly in an electric furnace, is usually quite significantly higher than the cost of preheating the scrap in appropriate preheating equipment and then charging it into the furnace. The preheater may use a relatively inexpensive carbonaceous fuel as a source of heat, and therefore there is a significant cost saving factor as between using relatively expensive electric heat in the furnace and a relatively inexpensive carbonaceous fuel in preheating equipment. Also, the rate of consumption of electrodes is reduced if the scrap is preheated, and the saving in electrode cost can also be substantial. A further cost advantage is afforded by an increased output from the furnace, the capital cost of a given furnace thus being amortized over a higher output. Only a portion of the savings in amortized capital costs is offset by the capital cost of preheating equipment.

Another advantage of preheating is the removal of various objectionable impurities from the scrap by preheating the scrap before charging it into the furnace. Moreover, the preheating of the scrap removes ice or water which would, if the scrap were charged directly into the furnace, create a serious danger of explosion.

In view of the many advantages of preheating of scrap before it is charged into a refining furnace, several systems have been proposed and utilized for preheating scrap. Many of the systems proposed heretofore involve directing a flame jet directly into the scrap, such as by the use of a special scrap vessel that is equipped with burners or a vessel with openings through which flame jets can be directed. With these systems, the vessel itself usually becomes heated to a temperature nearly as high as, or in some cases higher than, the scrap, and therefore it is necessary for the vessel to be lined with a refractory material to protect a structural shell from being damaged and to maintain a strength sufficient to enable the preheated scrap to be transported to the furnace in the vessel. Moreover, the fumes and smoke evaporating from the scrap as it is heated are often allowed to be released, together with substantial quantities of heat, directly to the atmosphere with the result of serious air pollution and high-heat losses through the stack. To make such a system acceptable from the pollution standpoint, the objectionable constituents of the effluent gases must be removed by expensive gas cleaning equipment, and the requirement for such equipment offsets some of the advantage of the preheating operation.

A scrap vessel or bucket lined with a refractory material is so highly subject to damage and to the necessity of frequently replacing the fire brick as to make it completely unfeasible. Scrap buckets are usually loaded by a magnetic crane, and unless particular care is taken to lower a load gently into the bucket, rather than dropping it from some height above the bucket, the impact of the scrap falling into the bucket can quickly destroy the refractory lining. On the other hand, the possibility of eliminating a fire brick lining in the types of preheating apparatus proposed heretofore would require reducing the degree of heating of the scrap to a level that offsets, to a significant degree, nearly all of the advantages to be gained by preheating. Furthermore, it is extremely difficult with direct heating by flame jets to control the temperatures in the vessel, especially if the scrap contains significant amounts of combustibles.

SUMMARY OF THE INVENTION

There is provided, in accordance with the invention, a novel and improved method of and apparatus for preheating scrap metal that not only overcome many of the disadvantages of equipment and procedures proposed and used heretofore but also provide several significant advantages. More particularly, the apparatus of the invention comprises a receptacle for the scrap to be preheated and a unitary furnace structure that includes a combustion chamber for generating hot gases by combustion of a carbonaceous fuel, and a circulating system for conducting gases from the chamber to the scrap receptacle and discharging them into generally the center of the mass of scrap and for withdrawing gases from the vessel, and circulating them back to the heating chamber. A substantial portion of the exhaust gases from the scrap are circulated in a closed-circuit back to the receptacle, but a portion of the gases are released to a stack to make way for a combustion-supporting gas, such as air, introduced to the chamber to burn the fuel.

In a preferred embodiment of the invention, the scrap receptacle, or the so-called "scrap bucket," is of a conventional type provided with a "clam shell" or "orange-peel" closure in the bottom and a substantially fully open top through which it is loaded. The furnace structure includes a supply conduit for conducting heated gas to the bucket and a cover or hood adapted to be placed over the open top of the bucket. The supply conduit for introducing heated gases into the scrap includes a portion that extends through the hood and down into generally the center of the bucket so that heated gases are released into generally the center of the scrap mass in the bucket. A return conduit for taking exhaust gases from the bucket back to the heating chamber leads off from the hood, the hood preferably being arranged to be seated in sealed relation over the opening at the top of the bucket. A blower in the return conduit delivers heated gases from the furnace chamber through the heated gas supply conduit and out into the scrap mass under pressure and draws the exhaust gases from the scrap mass through the return conduit and delivers them back to the heating chamber.

The supply conduit for delivering heated gases to the scrap in the bucket preferably includes a portion that is mounted on the bucket, such as by means of a transverse support structure extending across the top opening of the bucket. The upper end of such portion of the supply conduit, which may be termed an inlet conduit, receives, in substantial sealing relation, a portion of the supply conduit that is carried by the furnace structure. The inlet conduit depends from the transverse supporting structure and is provided with one or more openings in generally the center of the bucket for discharging the heated gases into the mass of scrap. With this arrangement, the furnace structure is preferably arranged to be moved, relative to the bucket, so that, prior to preheating, the scrap may be loaded into the bucket and the hood may be moved into position above the bucket and after preheating is completed, the hood can be moved out of the way so that the bucket may be picked up and transported to the refining furnace for charging of the preheated scrap into the furnace.

To permit the bucket to be loaded without intrusion of scrap into the inlet part of the conduit which is associated with the bucket, a plug is provided to close the upper end of the inlet conduit. Inasmuch as the scrap might otherwise overload and damage or destroy the inlet conduit and its support, it is preferable to arrange either the conduit or the plug in a manner providing support for the center region at the top of the inlet conduit from the bottom of the bucket so that, in effect, the inlet conduit or the plug constitute a structural column extending up through the middle of the bucket. This result may be achieved by either having an inlet conduit that extends all the way to the bottom of the bucket or, if the conduit extends only part way to the bottom, by providing a plug that extends to the bottom.

The apparatus and method, according to the invention, offer numerous important advantages. By introducing heated gases into the center of the charge, the scrap in the bucket is heated from the inside out. There is, of course, a temperature gradient in the mass of scrap in the bucket, the temperature of the scrap decreasing in a radial direction. However, this means that the temperature of the bucket itself is kept relatively low, and it is therefore unnecessary to line the bucket with fire brick. This in turn, means that the bucket is relatively immune to damage from scrap that may be dropped into it from a relatively high elevation above the bucket.

Efficiency is promoted by the retention of heat within the system due to recirculating in closed circuit a substantial amount of the gases exhausted from the scrap after passing through it. Moreover, the combustibles in the scrap are burned in the combustion chamber and add heat to the system. The burning of the combustibles also significantly reduces pollution problems. The provision of a unitary furnace structure that is movable makes it practical and indeed preferable, to use the equipment sequentially to preheat scrap in buckets at two or more stations, one bucket being preheated while another bucket is transferred to the refining apparatus for charging of a previously preheated scrap load into the furnace and then returned and filled with cold scrap. From both the standpoints of structural design and heat conservation, the supply of heated gas to the bucket and withdrawal of exhaust gas from the bucket from one end, preferably the top end, provides important advantages as to initial cost and operating efficiency.

In a preferred arrangement, the furnace unit is arranged to rotate about a vertical axis, and in such a case, the excess gases that are vented to a stack may be vented to a single, hood-type stack. At the same time, a pivot mounting makes possible relatively simple systems for supplying fuel to the burner and electrical current to motors and controls through generally axially located, rotating-type connections.

It is apparent that with the charging of the bucket in a manner such that there is a cavity in the center where filling of scrap is obstructed by the presence of the inlet conduit and plug that a hole remains in the center of the charge. This hole reduces expansion problems, facilitates heat distribution throughout the charge, and reduces problems of spot overheating of the bucket or the base upon which the bucket rests.

DESCRIPTION OF THE DRAWINGS

For a better understanding of the invention, reference may be made to the following description of an exemplary embodiment, and certain modifications of it, taken in conjunction with the figures of the accompanying drawings, in which.

DESCRIPTION OF EXEMPLARY EMBODIMENT

Figure 1:
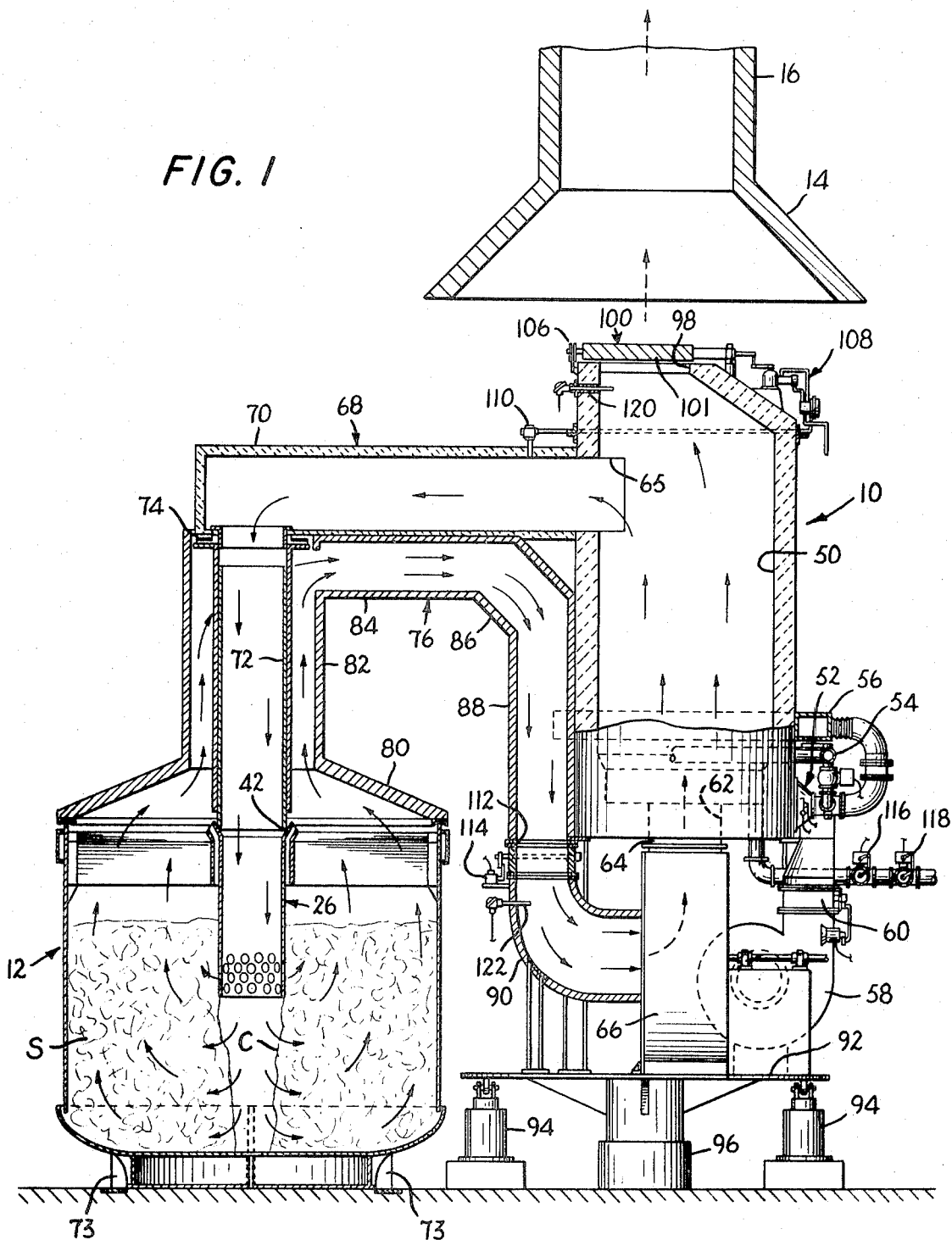
FIG. 1 is a side view in section of the embodiment, certain portions, however, being shown in full to eliminate unnecessary detail and various components being illustrated schematically.
Figure 2:
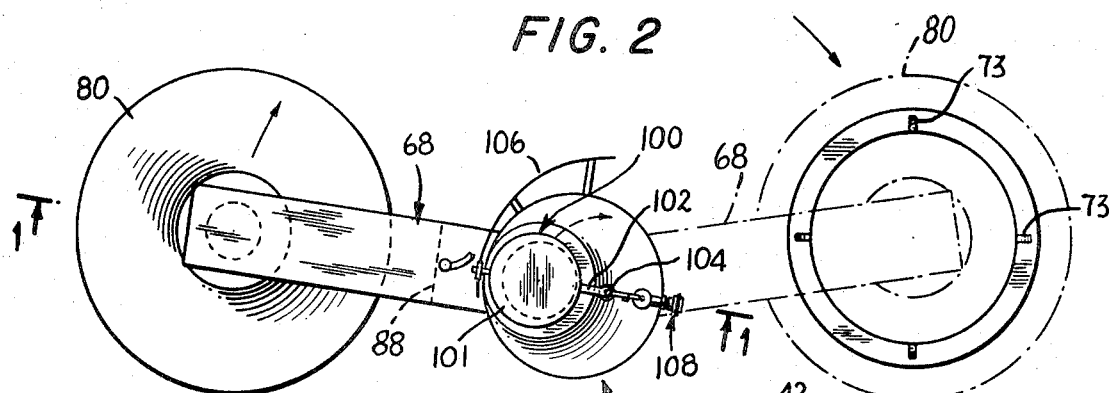
FIG. 2 is a top view of the embodiment of FIG. 1 and illustrating, in phantom lines, an alternative position of the furnace structure apparatus so that it can be used to serve scrap buckets at two stations in alternation with each other.

Referring to FIGS. 1 and 2 of the drawings, the preheating equipment, according to the invention, comprises a furnace structure 10 by which gases are heated and circulated into, through, and out of a scrap receptacle or bucket 12. A portion of the exhaust gases are returned to the furnace 10 and are recirculated back to the bucket, and some of the gases in the furnace are discharged into a hood 14 at the lower end of a stack 16.

Basically, the scrap bucket 12 is of conventional construction and comprises a cylindrical, vertical wall 18, an opening 20 at the top that is defined by the upper end of the cylindrical shell 18, and a bottom closure 22 of the type that can be opened up to discharge the contents of the bucket. The bottom closure 22 may be of any suitable form of "clam shell" or "orange-peel" construction, many forms of which are known to those skilled in the art and which, therefore, are neither described or shown in detail. Generally, the bottom of such closure 22 includes a supporting structural element 24 that permits the bucket to be placed on a floor or other desired resting place.

Various types of scrap buckets may be modified to adapt them to the apparatus of the invention by installing an appropriate structural support for mounting a central inlet conduit or core tube 26 in the top opening of the bucket. In the illustrated embodiment, the structural support is constituted by a pair of radial structural members 28 extending inwardly from and aligned on a diameter of the cylindrical shell 18. Although the cross sections of the structural support elements 28 may take various forms, it is advantageous to provide them with upwardly facing surfaces that are inclined so that scrap being loaded into the bucket will be deflected rather than impacting against an upwardly facing horizontal surface. To this end, the structural supports 28 may be of generally diamond shape in cross section oriented with a point or apex of the diamond uppermost.

Inasmuch as the scrap will usually be loaded into the bucket by a magnetic crane and may be dropped from some height from above the bucket, it is desirable to make the supports quite rigid and durable and to make provisions for independently supporting the center part of the supports from the bottom of the bucket when the bucket is being loaded. More particularly, as will become more readily apparent from the description below, the core tube 26 functions as an inlet conduit for conducting heated gases from the furnace unit 10 into the bucket, and therefore the scrap loaded into the bucket must be prevented from entering and filling the core tube. To this end, the scrap bucket is provided with a plug 30 (see FIG. 3) that occupies the core tube and extends from the top of the core tube down through it and all the way to the bottom of the bucket where it is supported on the bottom closure 22.

Figure 3:
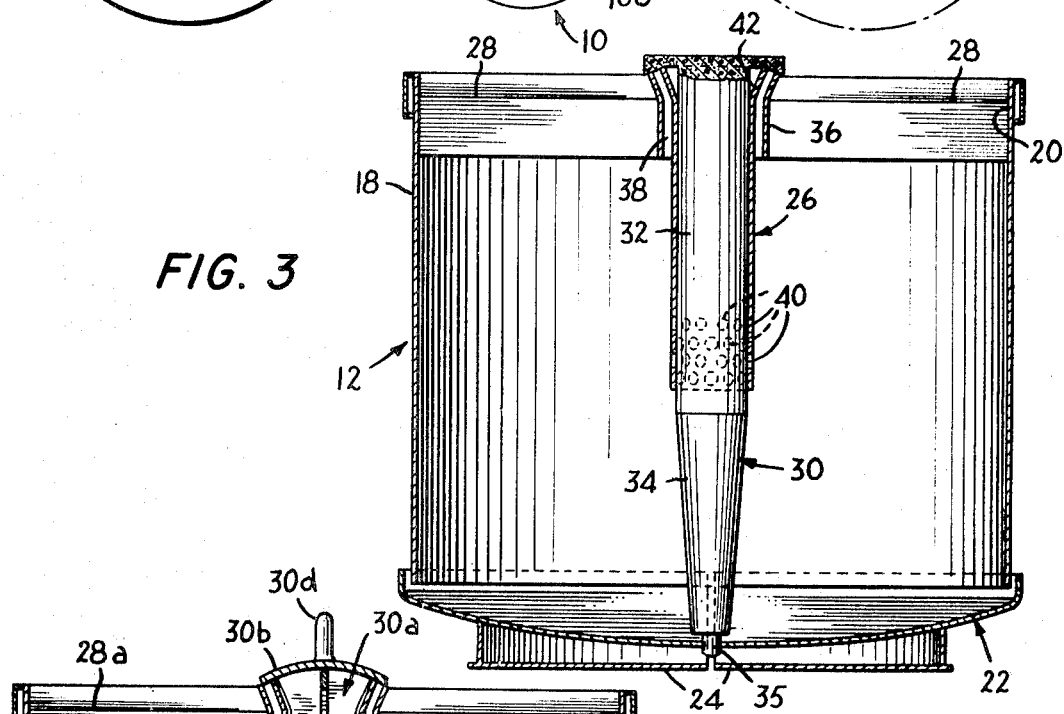
FIG. 3 is a side view in section of the scrap bucket of the embodiment of FIG. 1 with one form of plug in position in the inlet conduit, the view being on a slightly larger scale than FIG. 1.

As shown in FIG. 3, the upper part 32 of the plug is cylindrical and has a diameter just slightly less than the diameter of the core tube 26, while the bottom portion 34 tapers in a downward direction, this configuration aiding in providing a desirable distribution of scrap (see FIG. 1) such that the tendency for the scrap load to cave in at the region previously occupied by the lower part 34 of the plug 30 is somewhat restricted. In particular, as shown in FIG. 1, after the scrap bucket 12 is filled with scrap, which is designated by the letter S in FIG. 1, a central tapered cavity C remains at the bottom portion of the scrap and under the core tube 26. The cavity C assists in providing a good conduction path for heated gases to enter the scrap in the bucket and to be distributed relatively uniformly throughout the vertical cross section of the scrap.

At the upper end of the plug 30 is a flat steel plate, which permits the plug to be installed and removed by a magnetic crane. The conical bottom portion of the plug facilitates inserting and guiding the plug into the tube, and a boss 35 at the bottom of the plug fits into a companion opening in the bottom closure 22 of the bucket and thus maintains the plug in axial alignment and prevents it from being knocked out of alignment as scrap is emptied into the bucket. The body of the plug may be constructed of reinforced concrete, or it may be a tubular shell filled with concrete or a tubular shell strengthened with internal plates. Regardless of how it is made, it should be of durable construction so as to withstand the severe impaction of scrap emptied into the bucket.

In this regard, by supporting the core tube from the bottom of the bucket, as in the embodiment of FIG. 3, the plug, in effect, constitutes a structural column. That is, it is capable of absorbing impact loads of scrap falling on top of it. Inasmuch as impacts on the tube 26 involve an area which is the most likely to produce overloading on the support elements 28, the plug, in addition to its primary function of preventing intrusion of scrap into the core tube 26, also plays an important function in preventing damage and possible failure of the core tube and structural support elements 28.

Inasmuch as the gases introduced into the bucket through the core tube 26 are heated to a very high temperature, it is desirable to restrict the transfer of heat from the core tube 26 to the structural elements 28. One way of restricting heat conduction from the tube 26 to the supports 28 is to provide a central, mounting sleeve 36 welded onto the inner ends of the supports 28 and to mount the core tube 26 on a plurality of generally radially disposed, circumferentially spaced plates or spacers 38 welded onto the inner wall of mounting ring 36. The core tube 26 is preferably tack-welded onto the inner edges of the plate 38 so that it will be relatively simple to replace the core tube. Because of the high temperature and impact conditions to which the core tube is exposed, it may have to be replaced from time to time. The provision of the mounting ring 36 and the fins 38 for supporting the core tube 26 provides a space between the outside of the core tube and the inside of the mounting ring 36 that limits the transfer of heat between the core tube and the structural supports 28.

In the embodiments shown in FIGS. 1 and 3, the core tube 26 extends down into the bucket only to generally the center. The lower end of the tube is open and the lower part of the wall is provided with a multiplicity of holes 40. Heated gases from the furnace 10 are consequently released to the scrap out of the bottom of the tube and also out through the holes 40. The upper end of the core tube 26 flares outwardly to provide a funnellike portion 42 that serves as a seat for a conduit section (described below) associated with the furnace 10.

Figure 4:
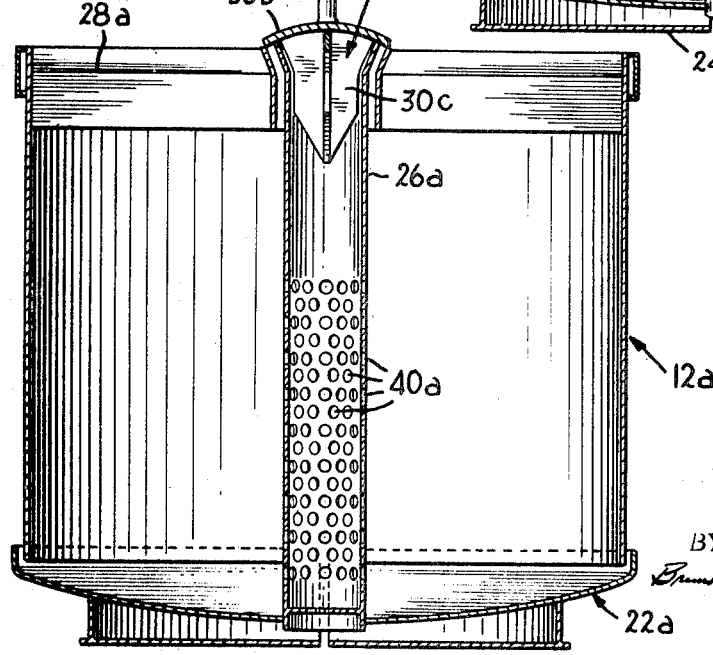
FIG. 4 is a view of a scrap bucket that is provided with modified forms of inlet conduits and plugs.

Referring to FIG. 4, an alternative form of scrap bucket 12a is of generally the same basic construction as the bucket illustrated in the embodiment of FIG. 3. However, it includes a modified form of core tube 26a and plug 30a, the basic difference of FIG. 4 residing in the fact that the core tube extends all the way to the bottom of the bucket and is structurally supported on the bottom closure 22a when the bucket is closed. The details of the manner of supporting the core tube on the bottom closure are matters of design and are neither described nor illustrated in detail. In order to provide distribution of hot gases throughout the mass of scrap contained in the bucket, the lower portion of the tube 26a, from a point just above the vertical center of the bucket extending to close to the bottom of the bucket, has a multiplicity of holes 40a.

Inasmuch as the core tube 26a itself is supported from the bottom of the bucket, the advantage of a central column structure, to ensure against damage or destruction of the supports 28a and the core tube 26a, is provided. Therefore, the embodiment of FIG. 4 may be used with a plug that is relatively short in length and of relatively lightweight construction, such as a domelike metal plate element 30b having depending plates 30c formed to maintain the plug in position and to facilitate its insertion and positioning in the tube. The form of plug in the embodiment of FIG. 4 may be arranged to be lifted by a magnet as in FIG. 3 or it may be equipped with a lifting ring 30d, as shown.

Referring again to FIGS. 1 and 2, the furnace 10 comprises a heating or combustion chamber 50 constituted by a cavity of suitable shape formed by a suitable form of structural, insulating and fire-resistant shell, such as a cylindrical metal shell lined with fire brick and insulating material (not shown in detail). At the lower end of the chamber 50 is a multiplicity of carbonaceous fuel burners, such as gas burners 52. In FIG. 1, only one burner is shown, for simplicity of illustration, but it will be understood that several burners, say four, are distributed circumferentially around the base of the chamber and are positioned to direct flame jets generally inwardly into the lower end of the chamber. Fuel is supplied to the burner 52 through a header 54, and a combustion-supporting gas, such as air, is supplied from a header 56, the air being delivered by a blower 58 mounted below the furnace combustion chamber.

FIG. 1 illustrates some of the safety controls associated with the burners and a damper 60 and its control in the blower output pipe, but the details of such elements are conventional and need not be described here.

A central opening 62 in the bottom of the combustion chamber 50 is connected by a conduit section 64 to a circulation blower 66, and extending outwardly from an opening 65 near the upper end of the chamber 50 is a heated gas supply conduit system 68 that includes a generally horizontally and radially disposed conduit section 70 and a vertical conduit section 72 depending from the end of the horizontal section. A diaphragm-type expansion joint seal 74 of any suitable form is provided between the sections 70 and 72, and the construction of the connection between the two sections is arranged to permit a degree of vertical movement of the vertical section 72 relative to the horizontal section 70. The supply conduit structure 68 conducts heated gases, propelled by the circulation blower 66, from the combustion chamber, into the core tube of a bucket positioned adjacent the furnace unit and shown in FIG. 1, the bucket being located in proper position, relative to the furnace 10, on the shop floor by locators 73. The lower end of the vertical conduit section 72 seats in sealed relation on the funnel-shaped seat 42 of the core tube 26, and thus the core tube 26 constitutes a continuation of the supply conduit structure 68. It has been found that the metal-to-metal contact, together with the capability of the conduit section 72 to shift position and assume a seat on the core tube, provides an adequate seal.

A return conduit system 76 for returning exhaust gases from the scrap bucket 12 to the heating chamber 50 is composed of a cover or hood 80 that is of generally conical shape and seats on the upper rim of the bucket walls 18, a vertical conduit section 82 extending up from the hood 80, a horizontal conduit section 84 and sections 86, 88 and 90 that lead from the horizontal section down and into the input side of the circulation blower 66. The vertical section 82 of the return conduit system 76 is mounted outside and coaxially with the vertical section 72 of the supply conduction system 68, and therefore the vertical portion of the system 76 is constituted by a flow passage of annular shape in cross section.

All of the conduit structure of the furnace unit 10 is preferably of insulated construction to restrict heat loss and thereby promote efficiency in the equipment. It is apparent, moreover, that the conduits provide the structural function of supporting themselves and the hood, the conduits being cantilevered from the main part of the furnace 10, and thus the furnace is a unitary assembly.

The furnace is mounted in a manner that enables it to be moved into and out of position over the bucket it serves. More particularly, the mounting of the embodiment includes a base plate 92, roller supports 94 suitably spaced circumferentially from each other and carrying the load of the furnace and a central guide support 96. The roller supports 94 are carried by mechanical or hydraulic lifts for raising and lowering the entire furnace structure 10. The entire unit can be rotated about a vertical central axis constituted by the central support 96. In addition to providing a convenient way of moving the furnace unit so that it may serve selectively scrap buckets located at two or more positions spaced circumferentially about the axis, the pivotable mounting of the unit facilitates supplying fuel for the burners and electrical power for the blowers and controls of the equipment through rotatable-type connections in the center mounting 96.

Inasmuch as combustion air is continually introduced into the system to support combustion of combustibles in the heating chamber 50, it is, of course, necessary to release gases from the system at a rate closely related to the rate of input of combustion air, plus any air admitted through leakage such as leakage through cracks between parts of the bottom closure 22. Excess gases are released through a top vent opening 98 which is equipped with a cover 100 that may be opened to an extent appropriate to release gases from the chamber 50 at a controlled rate. One form of controllable cover 100, as illustrated in FIGS. 1 and 2, comprises a circular closure plate 101 that is mounted on an arm 102 extending radially from one edge and pivoted on a pivot axis 104 and is supported at a diametrically opposite point on a roller-track arrangement 106. A suitable form of control, such as a hydraulic-motor control mechanism 108 opens and closes the cover 100 in accordance with a pressure measured at an appropriate place in the system. For example, a pressure-responsive component 110 of the control unit 108 may be mounted in the outlet supply conduit section 70 near the point where the section 70 leads from the heating chamber 50.

In order to prevent the motor that drives the circulation blower 66 from being overloaded and also to allow it to be operated at an optimum horsepower output, the return conduit system 76 is provided with a damper 112, which may be of the louver type, that is controlled by a control unit 114, represented schematically, in accordance with the current supplied to the circulating blower motor. When the current exceeds a safe operating level, as in the normal condition when the equipment is started up and relatively cool air is being drawn by the blower, the damper is closed down to the extent necessary to restrict airflow under the particular operating conditions. Similarly, if the circulating blower drops below a certain preset level, the damper is opened up to provide increased air flow to the blower.

The burners are preferably of the proportional type, that is, a type which maintains a rate of supply of air that is proportional to the rate of fuel supply so that substantially all of the air is consumed in burning the fuel. In this regard, it has been found that the hot gases delivered to the receptacle should be substantially free of oxygen, say not more than about 2 percent by weight oxygen. Otherwise, combustibles in the scrap will burn in the bucket and may produce hot spots and spot-melting of the scrap. The burners are controlled by two thermostatically operated controls 116 and 118, which are illustrated schematically in association with the gas supply line. One of the burner controls 116 or 118 controls the burners in accordance with a temperature monitored in the combustion chamber, such as by a thermocouple 120 mounted near the top of the chamber. The other burner control is under the control of a temperature monitored in the return conduit 76, such as be a thermocouple 122 located in the conduit section 90 just below the damper 112.

If the temperature in the combustion chamber exceeds a certain level, say 1,600° F., this is indicative of excessive heating in the chamber 50, and the burner control associated with the thermocouple 120 in the chamber 50 will turn down the burners to reduce the heat input to the chamber. If the temperature measured in the return conduit, which is indicative of the temperature within the scrap in the bucket, exceeds a given level, say 1,000° F., this is indicative of completion of the preheating process, and the burner control governed by the thermocouple 122 will turn down the burners to a level providing no appreciable input of heat beyond that necessary to maintain a desired temperature in the scrap.

To summarize the operation of the apparatus and an exemplary method, according to the invention (the method has, for the most part, been described implicitly in the foregoing description of the apparatus, the equipment is started up by turning on the combustion air blower 58 and circulating blower 66 and then igniting the burners, whereupon air is consumed in burning the fuel in the burner, and the hot gases of combustion are circulated through the supply conduit system 68 into the mass of scrap previously loaded into the scrap bucket. The hot gases are conducted through the inlet conduit (core tube) 26 and into generally the center of the mass of scrap in the bucket and are distributed through the open end of the core tube and the openings in the lower portion of the wall of the tube out into the scrap mass. Under the control of the vent closure plate 100, the pressure within the combustion chamber is built up to a level to provide circulation of gas out into and through the mass of scrap but, preferably, without creating a pressure level such that fumes are forced out through any leakage points in the scrap buckets.

In particular, it has already been mentioned that the bottom closure of the bucket includes openings through which gases may escape from the bucket or air may enter the bucket. The pressure level within the bucket, taking into account the losses incurred in flow of gases through the scrap load, is preferably controlled such that there is a minimum of pressure differential between the bottom part of the bucket interior and the atmosphere. Consequently, leakage of fumes from the bucket out through openings in the clam shell or orange-peel opening at the bottom and leakage of air from outside into the bucket is restricted to a minimum.

After the hot gases flow through the scrap and, of course, transfer heat into it, they are drawn off through the hood, which is under a negative pressure, relative to the core tube, generated by the circulating blower 66, and conducted back through the return conduit system 76 into the heating chamber 50. During an initial start-up period, the temperature of exhaust gases returned to the combustion chamber is relatively low, and the air is relatively dense. Consequently, it is usually necessary for the damper 112 to be partly closed, which will occur automatically when the circulating blower 66 draws a predetermined current load, in order to prevent the blower from being overloaded by trying to propel an excessive amount, by weight, of gases through the system. Once the temperature of the exhaust gases has risen, upon heating of the scrap to the extent such that the density of the gases is somewhat reduced, the damper 112 will open up and maintain an efficient flow of gases through the system at or near the rated horsepower loading of the blower motor.

After the mass of scrap in the bucket reaches a relatively high temperature, the combustible materials in the scrap load will be vaporized and will mingle with the combustion product gases being circulated to the scrap and be drawn through the return conduit and delivered to the combustion chamber. By appropriately controlling the rate of input of combustion-supporting air through the burners or a separate excess-air supply, the combustion materials evaporated from the scrap are burned in the combination chamber and not only add heat to the system but are also consumed and are thus eliminated as a pollution source. This aspect of the apparatus and process, namely of providing combustion in the chamber 50 of a substantial part of the combustibles contained in the scrap, and the result of both reducing the requirement for input of heat from an external source (by way of fuel for the burners) and eliminating a substantial factor in potential air pollution by the effluent gases of the operation, constitute particularly advantageous features of the invention.

As mentioned before, the amount of gases released from the combustion chamber to the vent opening 98 and into the stacks 16 is controlled by the pressure in the furnace. As the pressure changes in accordance with changes in the operating conditions, the vent opening is regulated automatically. If the temperature in the combustion chamber exceeds a certain value, and it has been found that a temperature of about 1,600° F. is a suitable control level, the burners will be turned down and the desired temperature maintained; if the temperature does not reach the predetermined level, then the burners will continue to operate at capacity. When the temperature measured by the thermocouple 122, i.e., a temperature indicative of the temperature of the scrap, reaches a control level, which in turn is indicative of complete preheating of the scrap, the burners will be shut down to level providing a heat input which will merely hold the scrap at a control temperature.

When the refining furnace is ready for charging scrap into it, the apparatus is shut down, the furnace unit 10 raised sufficiently so that the hood 80 and conduit section 72 clear the parts of the bucket on which they seat, and the furnace unit is rotated about its axis so that the space above the bucket is clear. The bucket may then be transferred by crane to the refining apparatus and the preheated scrap emptied into it.

The equipment of the invention offers the advantage of being able to serve two or more scrap bucket stations. Referring to FIG. 2, a second bucket station is illustrated to the right of the furnace, and the furnace unit 10 may be readily pivoted into position and lowered over a bucket waiting at that station. That bucket will have been used in a previous operation, and while the equipment is being used to preheat a bucket at the station to the left in FIG. 2, the bucket at the right will have been carried to the refining apparatus, its load discharged and the bucket brought back and loaded with another charge of scrap. Consequently, the apparatus of the invention enables a single preheater to be used substantially continuously without any appreciable shutdown time for transferring a preheated load to a furnace, bringing the bucket back and loading it with another load of scrap.

The embodiment of the invention described above is intended to be merely exemplary, and those skilled in the art will be able to make numerous variations and modifications of it without departing from the spirit and scope of the invention. All such modifications and variations are intended to be included within the scope of the invention as defined in the appended claims.

We claim:

1. Apparatus for preheating scrap metal comprising a receptacle adapted to receive a mass of scrap to be preheated, a combustion chamber remote from the receptacle and having means associated therewith for burning a carbonaceous fuel in the chamber to produce heated gases, means for delivering heated gases from the chamber to the scrap receptacle including means for conducting the heated gases into generally the center of the mass of scrap, said means for delivering heated gases including an inlet conduit extending from exteriorly of the scrap mass to receive the hot gases from the chamber and extending at least into generally the center of the scrap mass, and having an opening at generally the center of the scrap mass to discharge heated gases into the scrap mass, and means for withdrawing the gases from a region of the vessel remote from the center of the scrap mass and recirculating at least a portion through the chamber and back to the scrap receptacle.

2. Apparatus according to claim 1 wherein the inlet conduit extends entirely through the receptacle and has a multiplicity of openings distributed over a substantial part of its length to discharge heated gases into the scrap mass.

3. Apparatus according to claim 1 wherein the inlet conduit is mounted on the receptacle, and further comprising a heated gas supply conduit leading from the chamber to a part of the inlet conduit exteriorly of the scrap mass, the supply conduit being mounted separately from the inlet conduit for selective coupling to the inlet conduit.

4. Apparatus according to claim 3 wherein the upper end of the receptacle has an opening through which it is loaded with scrap, and the inlet conduit extends from within the top opening down into the receptacle.

5. Apparatus according to claim 4 and further comprising a plug adapted to be removably received in the inlet conduit to block the intrusion of scrap into the inlet conduit when the receptacle is being loaded.

6. Apparatus according to claim 1 wherein the top of the receptacle has a loading opening through which it is loaded with scrap, and wherein the means for withdrawing gases from the receptacle includes a separate removable hood structure adapted selectively to be positioned over the opening to close the loading opening.

7. Apparatus according to claim 6 wherein the means for introducing heated gases into the receptacle includes a conduit extending through the hood structure and into the receptacle through the loading opening.

8. Apparatus according to claim 1 wherein the combustion chamber includes a vent opening for release of a portion of the gases therefrom.

9. Apparatus according to claim 8 and further comprising means for controlling the rate of release of gases through the vent opening in accordance with a pressure measurement indicative of the pressure in the combustion chamber.

10. Apparatus according to claim 1 and further comprising means associated with the withdrawing means for controlling the rate of withdrawal of gases from the receptacle.

11. Apparatus for preheating scrap metal comprising a receptacle having a substantially fully open top to receive therethrough a mass of scrap to be preheated, a combustion chamber remote from the receptacle and having means associated therewith for burning a carbonaceous fuel in the chamber to produce heated gases, an inlet conduit extending from the upper end of the receptacle and mounted thereon, the inlet conduit having an inlet end adjacent the top of the receptacle and having at least one opening in generally the center of the receptacle so as to be within a mass of scrap received therein, means for withdrawing gases from the top of the vessel including a hood structure adapted to fit over the top opening of the receptacle and a return conduit communicating with the hood for circulating gases from the receptacle back to the chamber, and a supply conduit for conducting heated gases from the heated chamber to the inlet conduit of the receptacle, the supply conduit extending through the hood structure and being adapted to be positioned in substantially sealed relation to the upper end of the inlet conduit.

12. Apparatus according to claim 11 wherein a portion of the supply conduit extends within a portion of the return conduit.

13. Apparatus according to claim 11 wherein all of the elements set forth therein, except for the receptacle and inlet conduit, constitute a unitary furnace assembly.

14. Apparatus according to claim 13 wherein the furnace assembly is mounted for movement relative to the receptacle so that the hood structure may be moved clear of the top opening of the receptacle to permit the receptacle to be loaded with scrap and to be lifted from above.

15. Apparatus according to claim 14 wherein the furnace structure is mounted for rotation about a vertical axis.

16. Apparatus for preheating scrap metal comprising a combustion chamber having means for burning a carbonaceous fuel therein to produce heated gases, a hood structure mounted in association with the chamber and in a position spaced generally laterally of the chamber, return conduit means communicating the hood structure with the chamber, supply conduit means communicating with the chamber at a place therein remote from the heating means to receive heated gases from the chamber and conduct them out of the chamber, the supply conduit including a portion passing through the hood structure and having an opening for discharging heated gases therefrom, and blower means in the return conduit means for maintaining flow of gases from the return conduit, through the chamber and out of the supply conduit.

17. Apparatus for preheating scrap metal comprising a receptacle having a substantially open top and adapted to receive a mass of scrap to be preheated, a support structure mounted on the receptacle in the top opening thereof, and an inlet conduit for heated gas carried by the support structure, the inlet conduit having an intake opening adjacent the support structure and a body portion depending from the support structure and having at least one opening located generally centrally of the receptacle, whereby heated gases introduced into the inlet conduit are released from the conduit generally centrally in a mass of scrap contained in the receptacle.

18. Apparatus according to claim 17 wherein the inlet conduit extends substantially all the way to the bottom of the receptacle and has a multiplicity of spaced-apart openings distributed along in a portion constituting substantially all of the bottom part of its length, thereby to discharge heated gases into the scrap mass over a relatively large, generally centrally located zone within the scrap mass.

19. Apparatus according to claim 17 and further comprising a plug adapted to be removably received in the top of the inlet conduit to block the intrusion of scrap into the inlet conduit when the receptacle is being loaded.

20. Apparatus according to claim 19 wherein the inlet conduit extends only part way from the supporting structure toward the bottom of the receptacle and wherein the plug extends all the way to the bottom of the receptacle so as to be supported on the bottom of the receptacle and to resist deformation of the top structure and inlet conduit when the receptacle is being loaded.

21. A method of preheating scrap metal comprising the steps of loading a receptacle with a mass of scrap to be preheated, burning a carbonaceous fuel in a combustion chamber remote from the receptacle to produce heated gases, conducting the heated gases from the combustion chamber along a confined path into generally the center of the mass of scrap in the receptacle and releasing the heated gases into the scrap mass at generally the center thereof, withdrawing all of the gases from the mass of scrap at a zone outside of the mass and conducting all of such gases along a confined path back to the combustion chamber, circulating to the receptacle a portion of a mixture of the heated gases generated by burning fuel in the combustion chamber and the gases withdrawn from the scrap mass, and releasing from the combustion chamber the remaining portion of the gases therein.

22. A method according to claim 21 wherein the gases in the receptacle are withdrawn at a zone that generally surrounds the confined path along which heated gases are delivered to the scrap mass.

23. A method according to claim 21 and further comprising the steps of monitoring a pressure indicative of the pressure in the combustion chamber, and controlling the rate of release of gases from the combustion chamber in accordance with the monitored pressure.

24. A method according to claim 21 and further comprising the step of controlling the rates of delivery of fuel and a combustion-supporting medium into the combustion chamber, thereby to control the rate of heat input into the combustion chamber.

25. Apparatus for preheating scrap metal comprising a receptacle for a mass of scrap to be preheated, a combustion chamber remote from the receptacle, means in the combustion chamber for burning a carbonaceous fuel to produce heated gases, means for conducting the heated gases produced in the combustion chamber along a confined path into generally the center of the mass of scrap in the receptacle and for releasing the heated gases into the scrap mass at generally the center thereof, means for withdrawing all of the gases from the mass of scrap at a zone outside of the mass and for conducting all of such withdrawn gases along a confined path back to the combustion chamber and means for releasing from the combustion chamber a portion of the mixture of heated gases and gases withdrawn from the mass of scrap.

* * * * *